No Printed Specification Available
9317X
J. B. Allen.
Packing Tobacco.
No. 9,317 x
Patented Jan. 15, 1836.
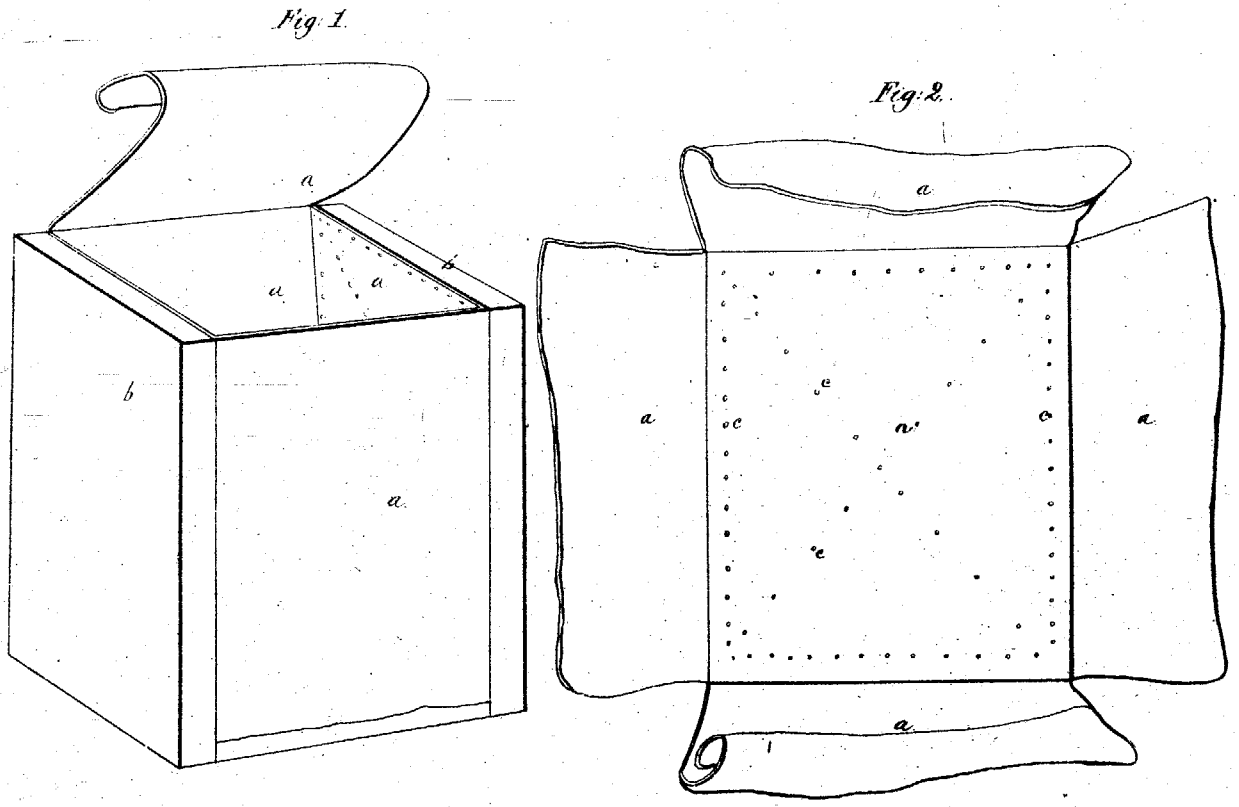
SPECIFICATION NOT AVAILABLE.

J. Beverly Allen, County of Henrico. Virginia.

Letters Patent.

The schedule referred to in these Letters Patent and making part of the same containing a description in the words of the said J. Beverly Allen himself of his Improvement in the box for packing Tobacco.

To all to whom these Presents shall come,

Be it known that I. J. Beverly Allen, in the County of Henrico and State of Virginia, have invented a new and useful machine, and that the following is a full and exact description thereof.

It is a square box for pressing tobacco in, four sides of which are of tin and two of wood fastened together, by small tacks driven through the tin into the wood on two sides and locked or soldered on four sides. The box is sealed on one of the wooden ends or sides the tobacco put into it; and the common screw for pressing tobacco applied at the opposite end;

This box may thus be used alone or it may be contained in an outer box of any description of wood. Before this box was invented the manufacturers of pressed tobacco were compelled to use oaken boxes the material for constructing which has recently become very costly and difficult to be obtained.

What I claim as my own invention and not previously known in the above described machine is the use of tin for four sides thereof instead of wood which was before exclusively used,

J. Beverly Allen.

Witness
P. D. M. Kinney
Wm White 273 207

Exd
Ch[illegible]